United States Patent
Cowell

[11] 3,811,320
[45] May 21, 1974

[54] SURFACE SCALER APPARATUS
[75] Inventor: Thomas E. Cowell, Woodland Hills, Calif.
[73] Assignee: Rockwell International Corporation, El Segundo, Calif.
[22] Filed: Mar. 12, 1973
[21] Appl. No.: 340,149

[52] U.S. Cl. .............. 73/67.8 S, 46/242, 73/67.8 S, 114/222, 214/1 CM, 324/37, 335/289
[51] Int. Cl. ...................... G01n 29/04, B25b 11/00
[58] Field of Search............... 73/67.5 R, 67.6, 67.7, 73/67.8 R, 67.8 S, 67.9, 71.5 U; 180/1 VS, 8 R; 46/241, 242, 243 R, 243 M, 243 LV; 214/1 CM, DIG. 2; 250/360; 29/81 R, 81 L; 114/222; 335/289, 290

[56] References Cited
UNITED STATES PATENTS
3,188,859   6/1965   Greenberg et al. ............... 73/71.5 U
3,409,854   11/1968  Swallert ............................ 335/289
3,585,851   6/1971   Walther ........................... 73/67.8 S

*Primary Examiner*—S. Clement Swisher
*Assistant Examiner*—John P. Beauchamp
*Attorney, Agent, or Firm*—L. L. Humphries; Henry Kolin

[57] ABSTRACT

A surface scaler apparatus for servicing various areas of a tank or the like, particularly remote limited access areas, is comprised of a pair of independently driven cross-members mounting one or more inspection or work tools, each limb of the cross-members riding on tracks in the adjoining limb so that as one cross-member is attached to the wall of the tank by electromagnets or the like, connected to the ends of the limbs, the other is free to move along the tracks on the attached limb. By energizing magnets on the just moved limb and releasing magnets on the attached limb, the previously attached limb now may be moved to a different position, thus enabling the apparatus to be moved remotely to any position for inspection purposes or the like.

10 Claims, 3 Drawing Figures

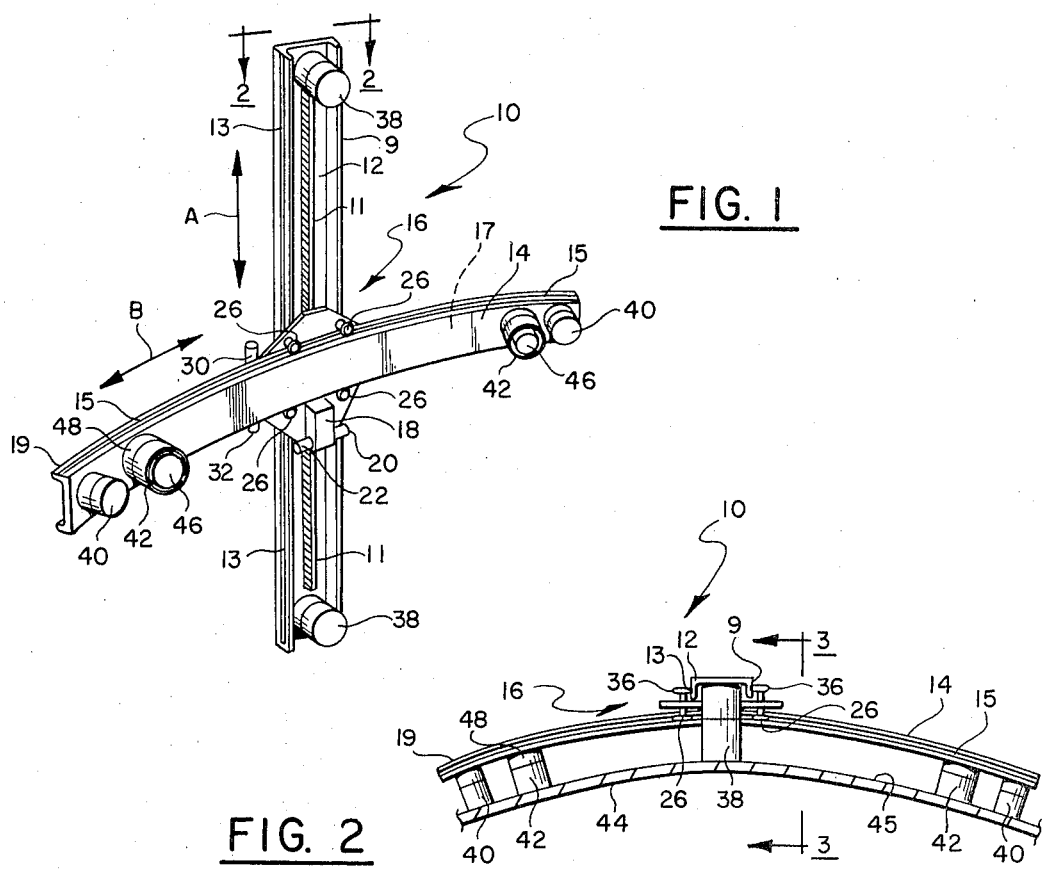
FIG. 1
FIG. 2
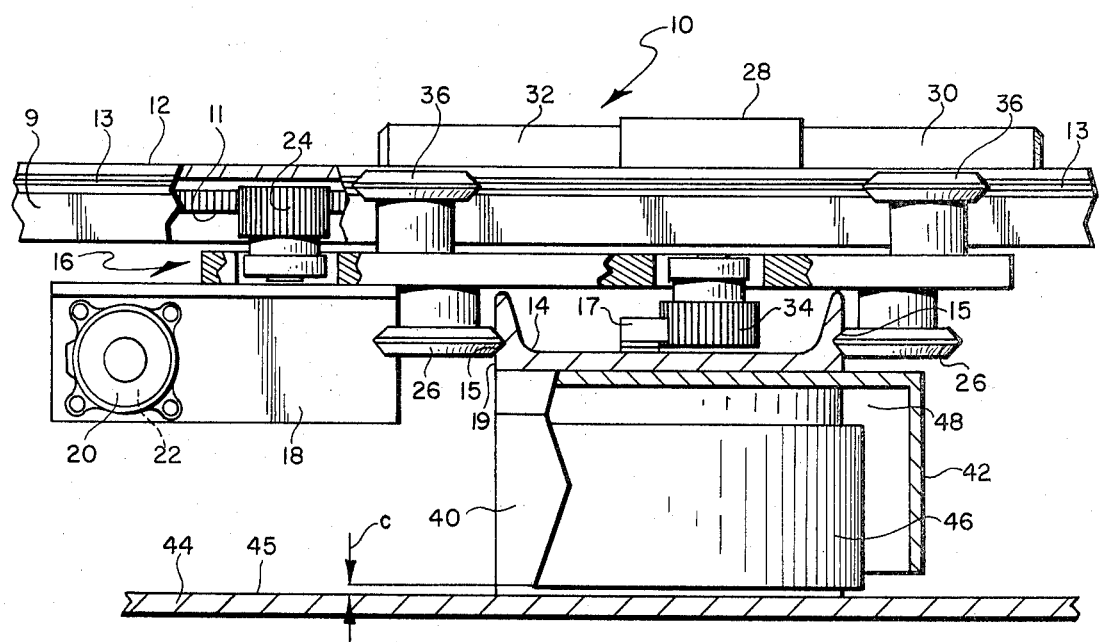
FIG. 3

3,811,320

SURFACE SCALER APPARATUS

BACKGROUND OF THE INVENTION

1. Field of the Invention

This invention relates to remotely transportable mechanisms which are adapted to move equipment into various areas, such as ultrasonic inspection devices, cleaning or painting equipment, television cameras or the like. The problem is to provide surface scaling devices which can be positioned anywhere, particularly in a limited access area.

2. Description of the Prior Art

U.S. Pat. No. 3,575,042 describes an ultrasonic detector which is positionable over a weld bead to be inspected by an apparatus that is affixed to the surface of the workpiece. An ultrasonic device is attached to the end of an arm of the apparatus, the arm being movable in four different directions, thus enabling the device to scan the length of a weld bead. This apparatus is disadvantaged in that it is only suitable to inspect only a portion of a lengthy weld bead whereupon after inspection of that portion of the weld bead, the base structure of the apparatus must be manually moved to a different position to inspect another portion of the weld, etc.

A similar U.S. Pat. No. 3,585,851 describes an ultrasonic inspection device wherein an arm of the device is fixed by magnets or the like to a workpiece parallel to a linear weld bead. A movable cross-arm is fixed to the fixed arm to scan down a specific length of the weld bead. This device must be manually moved to a different position to scan a further portion of a weld bead. Thus it is disadvantaged in that it is adaptable to inspect only a portion of a weld bead at a given time.

U.S. Pat. No. 2,104,062 is a surface scaling machine which is clamped or attached to a steel wall by an electromagnet. Cleaning equipment attached to the scaling device is movable along the vertical surface of a wall in one direction only. After the cleaning device makes one vertical pass up the wall, it must be physically removed from the wall and moved over to an adjacent section for further cleaning. Again this device is unidirectional only.

None of the foregoing prior art patents teach a means to remotely move a wall scaling apparatus in various areas such as limited access areas thus enabling the operator to position the device to any position for inspection purposes or the like.

Accordingly, it is an object of this invention to provide a scaling apparatus that is positionable anywhere, particularly within a limited access area, dependent upon the area to be inspected.

More specifically, it is an object of this invention to provide a surface scaling apparatus having a pair of independently driven cross-members so that by manipulation of one or the other of the cross-members, the device is positionable anywhere within a given area for inspection purposes or the like.

SUMMARY OF THE INVENTION

The surface scaler apparatus comprises a motor plate assembly and two cross-beams. The motor plate provides for mounting one electric motor and one encoder (position indicator) for each beam. It also provides guide support wheels which engage into slots in the adjacent beam. Each beam has a gear rack which permits the motors to propel or transport the beams back and forth by the wheels engaged in their respective slots. Affixed at the ends of both are wall attachment means. Such means are suitably electromagnets for attachment to a typical steel wall. However, for attachment to nonferrous surfaces, powered suction cups or the like may be used. The preferred embodiments of the invention will be described with respect to use of electromagnets as wall attachment means on such typical steel walls. On one, or both, of the beams there is also mounted, for example, ultrasonic inspection equipment positioned inwardly of the wall attachment means, e.g., electromagnets. The ultrasonic inspection heads are provided with pneumatic linear actuators that serve to position the ultrasonic inspection heads adjacent the portion to be inspected so that the ultrasonic inspection heads may be retracted after inspection thereby preventing damage to the ultrasonic heads during periods of movement of the surface scaler.

The device generally is a cruciform shape which can change into a T-shape or an L, or reverse thereof, by maneuvering the beams. The beams are maneuvered by alternately energizing a pair of electromagnets on either end of the beams thus affixing one beam on the wall while the other beam is being moved by the electric motors into a different position. The just-moved beam is then affixed to the wall by its pair of electromagnets while the corresponding adjacent beam is de-energized so that it may be moved along the just-fixed beam thus positioning it to a new location thereby enabling the device to be transported anywhere within a given area, particularly in a limited access area, to provide the function of inspecting or the like.

DESCRIPTION OF THE DRAWINGS

The above-noted objects and advantages of the present invention will be more fully understood upon studying the following detailed description in conjunction with the detailed drawings in which:

FIG. 1 is a perspective view of the cruciform shaped apparatus showing the essential operating features thereof;

FIG. 2 is a view taken along lines 2—2 of FIG. 1 illustrating the surface scaling apparatus as it is attached to the wall of a vessel or the like, and, FIG. 3 is a section taken along lines 3—3 of FIG. 2 illustrating the various means in which the two crossed beams are driven one along the other.

DESCRIPTION OF THE PREFERRED EMBODIMENT OF THE INVENTION

Turning now to FIG. 1 the surface scaler apparatus generally designated as 10 is comprised essentially of a vertical support beam 12 and an inner connected horizontal support beam or cross-beam 14. A motor plate assembly generally designated as 16 is positioned at the intersection of the cross-beams between the vertical and horizontal beams 12 and 14. Mounted to the motor plate assembly 16 is a series of guide wheels coacting to support and guide one beam on the other beam. At least four guide wheels 26 attached to the motor plate assembly 16 are positioned within guide wheel slots 15 running lengthwise of cross-beam member 14. The guide slots are positioned within the side rails 19 of the cross-beam member 14. A similar set of guide wheels 36 (FIG. 2) are positioned within slots 13 in sides 9 of vertical support beam 12. The motor plate assembly 16 additionally has attached thereto, a vertical support beam gearbox housing 18 which has attached on one side a vertical drive motor 20 and on the other side a vertical track encoder device 22. The track encoder 22, which generally comprises a device which converts linear increments of travel to electrical signals which are recorded and stored in a computer, serves to monitor the position of the vertical beam 12 as it is traversing the vertical guide rail slots 13 in side 9 of vertical beam 12, thus monitoring the position of the crossbeam on the motor plate by a remote monitoring system (not shown). Within the gearbox housing 18 is a system of gears which are connected to a drive gear 24 which protrude into the space between the side rails 9 of vertical beam 12. A vertical gear rack 11 attached to beam 12 engages with gear 24 thus enabling motor 20 to drive the vertical beam member in relation to the motor plate assembly 16.

At opposite ends of the vertical support beams are positioned a pair of electromagnets 38. The electromagnets are energized remotely to either engage or disengage the magnets from the surface 45 of a tank 44 or the like to be inspected (FIG. 2). At adjacent ends of the cross-beam 14 are positioned a pair of electromagnets 40. These electromagnets on the cross-beam are energizable remotely as are the electromagnets 38 on the vertical beam. Inwardly of the electromagnets 40 are positioned a pair of, for example, ultrasonic inspection transducers 46. Transducers 46 are housed within transducer housings 42. The transducer housings 42 are actuatable remotely by an actuating mechanism 48, generally comprising a double acting pneumatic actuator which extends and retracts the transducer housings so that the transducer may be engaged with or removed from the surface 45 of the tank 44 to be inspected or the like. The purpose of the actuating mechanism is to remove the transducer from the surface of the tank, while the surface scaler device 10 is moved to a different position, to prevent damage to the transducer heads.

The motor plate assembly additionally has a similar set of gears within the gearbox housing 28; the gearbox housing serves to drive the vertical beam 12 along the horizontal beam 14 by drive motor 30 monitored by the cross-beam encoder system 32. A gear rack mechanism 17 is positioned within the area defined by the side walls 19 of cross-beam 14. Gear rack 17 is engaged with gear 34 protruding from the cross-beam gearbox housing 28. Thus it can be seen that motor 30 drives the vertical beam along the horizontal beam. Motor 30 can also serve to drive the horizontal beam while the vertical beam is fixed.

In order for the surface scaler apparatus to be moved, for example, along a vertical direction "A," the electromagnets 38 on vertical beam 12 are energized while the electromagnets 40 on the cross-beam member 14 are deenergized so that motor 20 attached to gearbox housing 18 drive the cross-beam 14 vertically upwardly to a different position along the vertical beams 12. When the cross-beam member 14 is driven a given distance along the vertical beam 12, the electromagnets 40 are energized thus locking the cross-beam member to the tank 44 while the vertical electromagnets 38 are deenergized to move vertical member in a horizontal direction "B," thereby positioning the vertical member 12 along a horizontal plane. When the transducer devices are to be operated, the electromagnets 38 and 40 are both energized, thus providing a firm platform for the transducer inspecting devices.

Turning to FIG. 2 it can be seen that the scaler apparatus 10 is affixed to the wall 45 of, for example, a tank 44. Electromagnets 40 and 38 are energized and the transducer 46 is positioned against the wall 45 by actuating mechanism 48 for inspection purposes. It can be seen in this view that, if the electromagnets 38 are energized and the actuating mechanism for the transducer 48 retracts the transducer 46 from the surface 45 of wall 44 and if the electromagnets 40 are deenergized, the horizontal cross-beam 14 may then be traversed in either a left or right horizontal direction. Since the transducers 46 are positioned inwardly of the electromagnets 40, the beam can travel horizontally its maximum length along slot 15 of beam 14 to a point where the transducer goes over center; thus it can be seen that all areas within a horizontal plane can be inspected from one locked position of the vertical beam 12.

Turning now to FIG. 3, the enlarged view clearly shows how the vertical beam 12 and the cross-beam 14 are interconnected by motor plate assembly 16. The motor plate 16 is attached to vertical beam 12 by vertical guide support wheels 36 which are engaged with slot 13 in side 9 of vertical beam 12. The vertical gearbox housing 18 supports motor 20 and encoder 22. Gear 24 which protrudes through the motor plate 16 engages with gear rack 11 positioned within the walls 9 on the base of the vertical support beam 12. The gear 24 engaged with the gear rack 11 then drives the vertical beam member 12 in relation to the motor plate. Similarly, the motor plate assembly supports at least four cross-beam guide support wheels 26 which are engaged with slot 15 in wall 19 of cross-beam 14. A cross-beam gearbox housing 28 supports cross-beam drive motor 30 and cross-beam encoder 32. Gear 34 protruding from the cross-beam gearbox housing 28, engages with gear rack 17 attached to the innersurface to cross-beam 14. Drive motor 30 drives gear 34 up and down the gear rack, thus transporting the vertical support beam 12 back and forth along the cross-beam 14. In this view, electromagnets 40 are attached to wall 44 of a tank or the like while the ultrasonic inspection transducer actuating mechanism 48 moves transducer 46 into and out of engagement with surface 45 of the tank 44. Actuating mechanism 48 moves the transducer a distance "C" away from the surface 45 of tank wall 44, thus preventing the transducer from becoming scratched or otherwise disabled while the cross-beam 14 is moved along vertical beam 12. The apparatus can be "walked" along all surfaces of a container, for example, both flat and curved, including side walls, bottom and top walls as long as a not too severe a transition is provided as in a right angle corner. Transducers and electromagnets may be pivotably mounted to accommodate for varying surface curvatures.

Obviously many other different types of inspection or cleaning or viewing apparatus may be affixed to crossbeam 14 other than ultrasonic inspection devices.

The scaler device 10 is capable of moving in any desired direction. The normal and easiest controlled direction would be east to west or north and south. This is accomplished by driving either motor 20 or 30. If both motors 20 and 30 are energized while one beam member 12 or 14 of the scaler device 10 is locked in position by the electromagnets, then the travel of the inspection apparatus or the like is in a 45° direction. The device can be directed to move in any direction on a given surface (straight line or curve) by means of computer control. While the scaler device 10 finds its principal utility for the remote servicing of limited access areas, it may equally well be used for the servicing of more readily accessible areas. Thus while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

I claim:

1. Surface scaler apparatus comprising:
   a first limb,
   a second limb connected to and movable on said first limb, said second limb being angularly disposed with respect to said first limb,
   drive means connected to said first and second limbs to drive said first and second limbs, one across the other, to a new position,
   wall attachment means positioned on said first and second limbs to attach said surface scaler apparatus to a wall, and
   means to alternately attach said wall attachment means on said first or second limb while said wall attachment means on the other of said limbs is detached from said wall so as to alternately transport said first or second limb by said drive means across the other of said limbs to move said first and second limb to new relative positions.

2. The invention as set forth in claim 1 further comprising: remote position indicating means for each limb of said surface scaler.

3. The invention as set forth in claim 2 wherein said remote position indicating means is an encoder.

4. The invention as set forth in claim 1 further comprising work performing means connected to said first or second limb.

5. The invention as set forth in claim 4 wherein said work performing means on said first or second limb is at least one ultrasonic inspection apparatus.

6. The invention as set forth in claim 1 wherein said drive means is at least one electric motor for said first and second limb engaged with gears that are driven along gear racks positioned on said first and second limb.

7. The invention as set forth in claim 1 wherein said wall attachment means are electromagnets, at least one electromagnet being attached adjacent each end of said first and second limbs, the electromagnets on said first limb being actuatable independently of the electromagnets on said second limb.

8. A surface scaler apparatus for servicing remote limited access areas comprising:
   a pair of independently motor driven cross members, each containing a track means, each limb of the cross members riding on the track means in the adjoining limb,
   at least one electromagnet attached adjacent to each end of said cross members,
   means to alternately energize the electromagnets on one or the other of the cross members,
   the electromagnets on one limb of the cross members being adapted to be attached to a wall of said limited access area while the other limb of the cross members is free to move along the track means on the attached limb,
   remote cross members position indicating encoder means on each limb of said cross members to monitor the position of each limb, and
   work performing means connected to at least one limb of the cross members.

9. The invention as set forth in claim 8 wherein a means is provided to simultaneously energize electromagnets on both said pair of cross members so that a firm platform is provided to operate said work performing means.

10. The invention as set forth in claim 9 wherein said work performing means is an ultrasonic transducer for detecting flaws in the surface of said remote limited access area serviced by said surface scaler apparatus.

* * * * *